United States Patent
Von Novak

[19]

[11] Patent Number: 6,037,750
[45] Date of Patent: Mar. 14, 2000

[54] BATTERY PACK CONTROLLER

[75] Inventor: William Von Novak, San Diego, Calif.

[73] Assignee: Qualcomm Incorporated, San Diego, Calif.

[21] Appl. No.: 09/156,559

[22] Filed: Sep. 17, 1998

[51] Int. Cl.$^7$ .............................. H01M 10/44; H02J 7/00
[52] U.S. Cl. .......................................... 320/132; 320/128
[58] Field of Search .................................... 320/128, 132, 320/139, 107

[56] References Cited

U.S. PATENT DOCUMENTS

| | | | |
|---|---|---|---|
| 5,122,722 | 6/1992 | Goedken et al. ........................ | 320/116 |
| 5,648,714 | 7/1997 | Eryou et al. ............................ | 320/164 |
| 5,818,201 | 10/1998 | Stackstad et al. ...................... | 320/119 |

*Primary Examiner*—Peter S. Wong
*Assistant Examiner*—Gregory J. Toatley
*Attorney, Agent, or Firm*—R. Ben Miller; Gregory D. Ogrod

[57] ABSTRACT

A battery pack having a battery pack controller that combines the functions of a battery pack protection circuit, battery charger, current and voltage regulator, and a data monitor circuit. In one embodiment, the battery pack controller is implemented as a single integrated circuit (IC). In another embodiment, two external field effect transistors (FETs) are used along with a single IC battery controller. This combination of functions within one IC allows battery pack manufacturers to construct inexpensive and safe battery pack systems that do not require an external charger or a carefully regulated DC power supply to charge the battery pack. In one embodiment a voltage regulator includes a pulse charging circuit for pulse charging the batteries within the battery pack. Advantageously, the battery pack controller further includes a current regulator that regulates a charge current flowing into the first battery cell. The current regulator advantageously may include a means for trickle charging the battery cell. The battery pack controller also provides a processor interface that receives predetermined messages from and transmits data to an external processor, a charge termination means for terminating a charge current flowing into the first battery cell, and a discharge termination means for terminating a discharge current flowing out of the first battery cell. The battery pack controller monitors the battery and sends information concerning the battery to the external processor. This allows external processor to accurately terminate charge to the battery.

33 Claims, 4 Drawing Sheets

BATTERY PACK CONTROLLER

BACKGROUND OF THE INVENTION

I. Field of the Invention

The present invention relates to the field of batteries, and more specifically, to a battery pack controller for lithium-ion battery packs that provides power to portable electronic devices.

II. Related Art

Battery packs are a critical component of portable electronic devices, such as cellular telephones, laptop computers, and compact disc (CD) players, and similar types of battery-operated devices. The longer a battery pack can provide power to a cell phone or laptop the longer a user is able to enjoy use of those items. Moreover, the shorter the time it takes to charge a battery pack, the sooner the user is able to use those items away from a power outlet.

Conventional battery packs include a number of features to make the battery pack last longer and safer to use. For example, conventional Lithium-ion battery packs include a protection circuit, which is generally in the form of an integrated circuit (IC), that disconnects the battery within the pack from the battery-operated device when over voltage, under voltage, over current, and short circuit conditions exist. Without such protection circuitry, the battery pack could become damaged and catch fire causing personal injury and/or property damage. In addition to having a protection circuit or IC, some conventional battery packs include a separate data monitor IC. A data monitor IC is an IC that monitors various characteristics of the battery within the battery pack. For example, a typical data monitor IC will monitor the total current flowing out of the battery. By monitoring the current flowing out of the battery, the data monitor IC can be used for "gas gauging" the battery. Gas gauging refers to determining the amount of "life" remaining in a battery, that is, the amount of usable charge left in the battery. This feature enables users to know roughly how much time they have left to use the electronic device to which the battery is providing power.

A drawback of providing the protection and data monitoring features is that providing these features increases the cost of the battery pack because two separate ICs are added to the design.

Another drawback of conventional battery packs is that they require an external charger to provide current regulation when charging the batteries within the battery pack. An external charger adds to the cost, weight, and bulkiness of portable electronic devices.

Yet another disadvantage of conventional battery pack systems is that they require an external charger to provide a carefully regulated direct current (DC) voltage to charge the batteries within the pack. Such carefully regulated chargers are much more expensive than simple unregulated chargers.

What is, therefore, desired is a system to reduce the cost of a battery pack without having to sacrifice features such as battery protection and data monitoring. What is further desired is a battery pack system that does not need a charger with tight voltage and current regulation requirements to charge the batteries within the battery pack.

SUMMARY OF THE INVENTION

The present invention overcomes at least some of the above identified problems and disadvantages. In one aspect the invention provides a battery pack with a battery pack controller that combines the functions of a battery pack protection circuit, battery charger, current and voltage regulator, and a data monitor circuit. In one embodiment, the battery pack controller is implemented as a single integrated circuit (IC). This combination of functions within one IC allows battery pack manufacturers to construct inexpensive and safe battery pack systems that do not require a carefully regulated external charger to charge the battery pack.

More specifically, in one aspect, the invention provides a battery pack having a first battery cell, an input terminal that connects to an external DC power source, and a battery pack controller coupled between the input terminal and the first battery cell, wherein the battery controller includes a voltage regulator. When the input terminal is connected to the external DC power source the battery pack controller receives a DC voltage produced by the DC power source and provides a charge voltage to the first battery cell, wherein the voltage regulator maintains the charge voltage below a predetermined maximum regardless of the voltage produced by the DC power supply.

The above combination of features overcomes the problem of needing a carefully regulated external charger to charge the battery pack because the voltage regulator within the battery pack controller regulates the charge voltage.

In one embodiment, the voltage regulator includes a pulse charging circuit for pulse charging the batteries within the battery pack. This feature provides the advantage of enabling the battery pack to reach full charge quickly.

In another embodiment, the voltage regulator includes a transistor for coupling the first battery cell to the input terminal and a voltage regulator circuit that controls the transistor so as to maintain the charge voltage below the predetermined maximum regardless of the voltage produced by the DC power supply.

In another aspect, the invention provides a battery pack having a first battery cell, an input terminal that connects to an external DC power source, and a battery pack controller coupled between the input terminal and the first battery cell. The battery controller includes a current regulator that regulates a charge current flowing into the first battery cell. This feature overcomes the problem of needing a current limit circuit in an external charger to charge the battery back. The current regulator advantageously may include a means for trickle charging the battery cell. This feature produces a safer battery pack by providing a means to charge a deeply discharged battery with a minimal charge current. Charging a deeply discharged battery with a higher charge current can badly damage the battery.

In one embodiment, the current regulator includes a transistor for coupling the first battery cell to the input terminal, a current regulator circuit that controls the transistor so as to regulate the charge current flowing into the first battery cell, and a current sensor that senses the charge current and outputs a signal corresponding to the charge current to the current regulator circuit.

In another aspect, the invention provides a battery pack having a battery cell, an input terminal that connects to an external DC power source that provides power for charging the battery cell, and a battery pack controller coupled between the input terminal and the battery cell. The battery back controller includes a processor interface to receive predetermined messages from an external processor, a charge termination means for terminating a charge current flowing into the battery cell, and a conductor coupling the processor interface to the charge termination means. When the battery pack is in charge mode, the charge termination means is deactivated so that charge current can flow to the battery cell. But when the processor interface receives a given one of the predetermined messages, the processor interface sets a voltage of the conductor to a level that activates the charge termination means, thereby terminating charge current from flowing to the battery cell.

In one embodiment, the charge termination means includes a transistor coupled between the input terminal and the battery cell and a charge disable logic circuit that controls the transistor in response to a signal sent from the processor interface over the conductor.

In any one of the above aspects of the invention, the battery pack controller may also provide a protection circuit that continuously monitors a voltage across each battery cell, a charge current, and/or a temperature of the battery pack. Upon sensing at least one of an over current, over voltage, and over temperature condition, the protection circuit terminates the charging of the battery pack, thereby providing a safety mechanism. The battery pack controller may also provide a battery balancing system for balancing two or more battery cells within the battery pack. Preferably, the battery balancing system is controllable by an external processor through the processor interface. An advantage of this feature is that it extends the useful life of the battery pack.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention provides a battery pack with a battery pack controller that provides battery pack protection, voltage and current regulation, and an interface to an external processor that allows the external processor to collect data concerning the battery pack and to control the charging and discharging of the battery cells within the battery pack. Preferably, the controller is implemented as a single integrated circuit (IC). This combination of functionality within one IC allows battery pack manufacturers to construct inexpensive and safe battery pack systems that do not require an external charger or a carefully regulated DC power supply to charge the battery pack.

Figure 1:
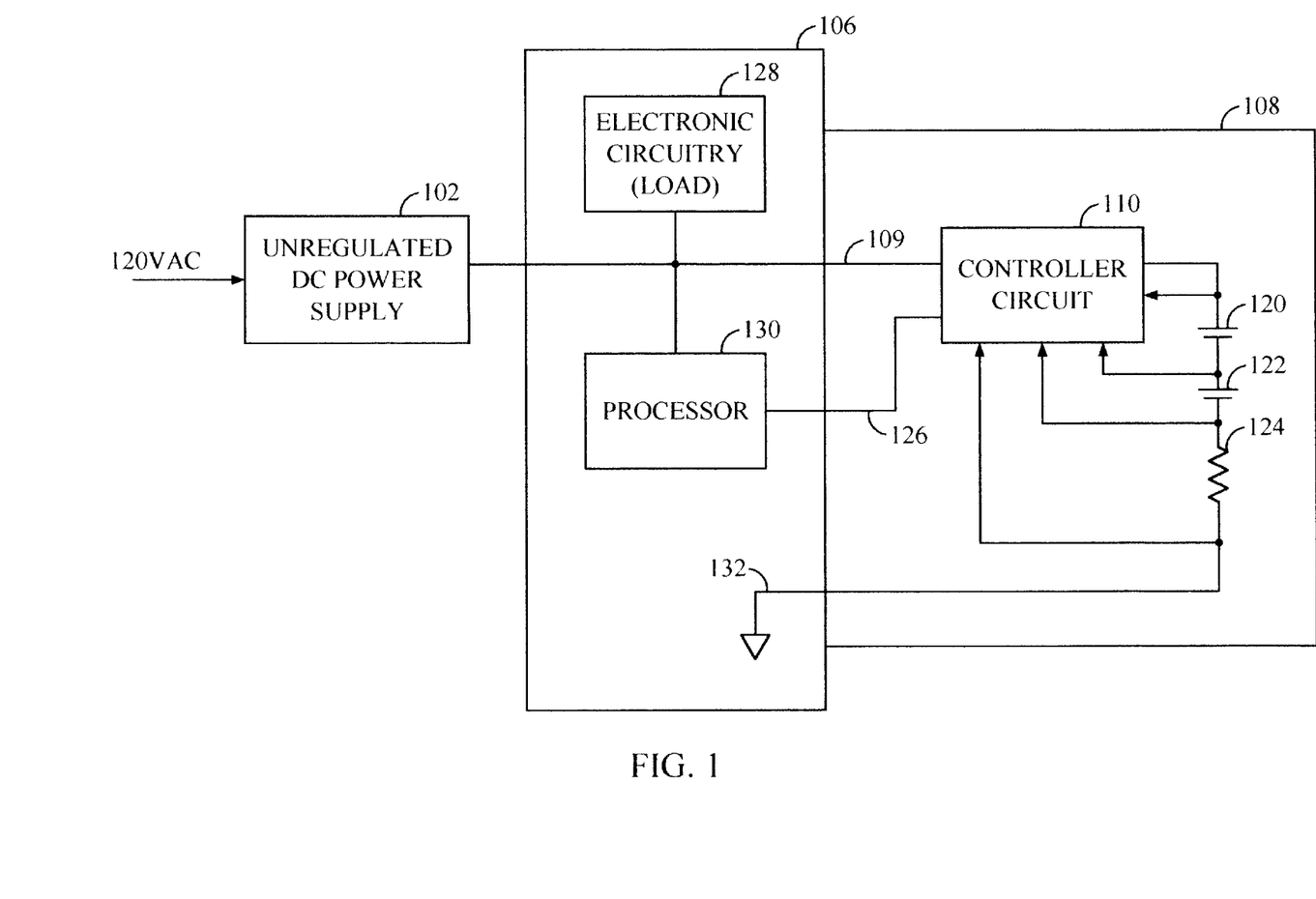
FIG. 1 illustrates a battery pack according to one embodiment.

FIG. 1 illustrates a battery pack 108 according to one embodiment. As shown in FIG. 1, battery pack 108 is used for providing power to a portable electronic device 106. More specifically, battery pack 108 provides power to the electronic circuitry 128 and a processor 130 within electronic device 106. Battery pack 108 includes a battery pack controller 110 (hereafter "controller"), battery cells 120 and 122, and a current sense resistor 124. Battery pack 108 also includes an input terminal 109 for connecting to portable electronic device 106 and to an unregulated DC power supply 102. There is also included a bus 126 for coupling processor 130 within portable electronic device 106 to controller 110. In a preferred embodiment, bus 126 is a one-wire bus. Bus 126 enables processor 130 to receive data from controller 110 and to control the charging and discharging of battery pack 108 by sending control messages to controller 110. Finally, there is a ground terminal 132 that allows return current to flow to and from the battery pack.

As illustrated in FIG. 1, battery cells 120, 122 can be charged without an external terminating charger and without a carefully regulated DC power supply. The unique features of controller 110 allow battery cells 120, 122 to be charged with only an unregulated DC power source 102, thereby significantly reducing the cost to charge battery pack 108.

Figure 2:
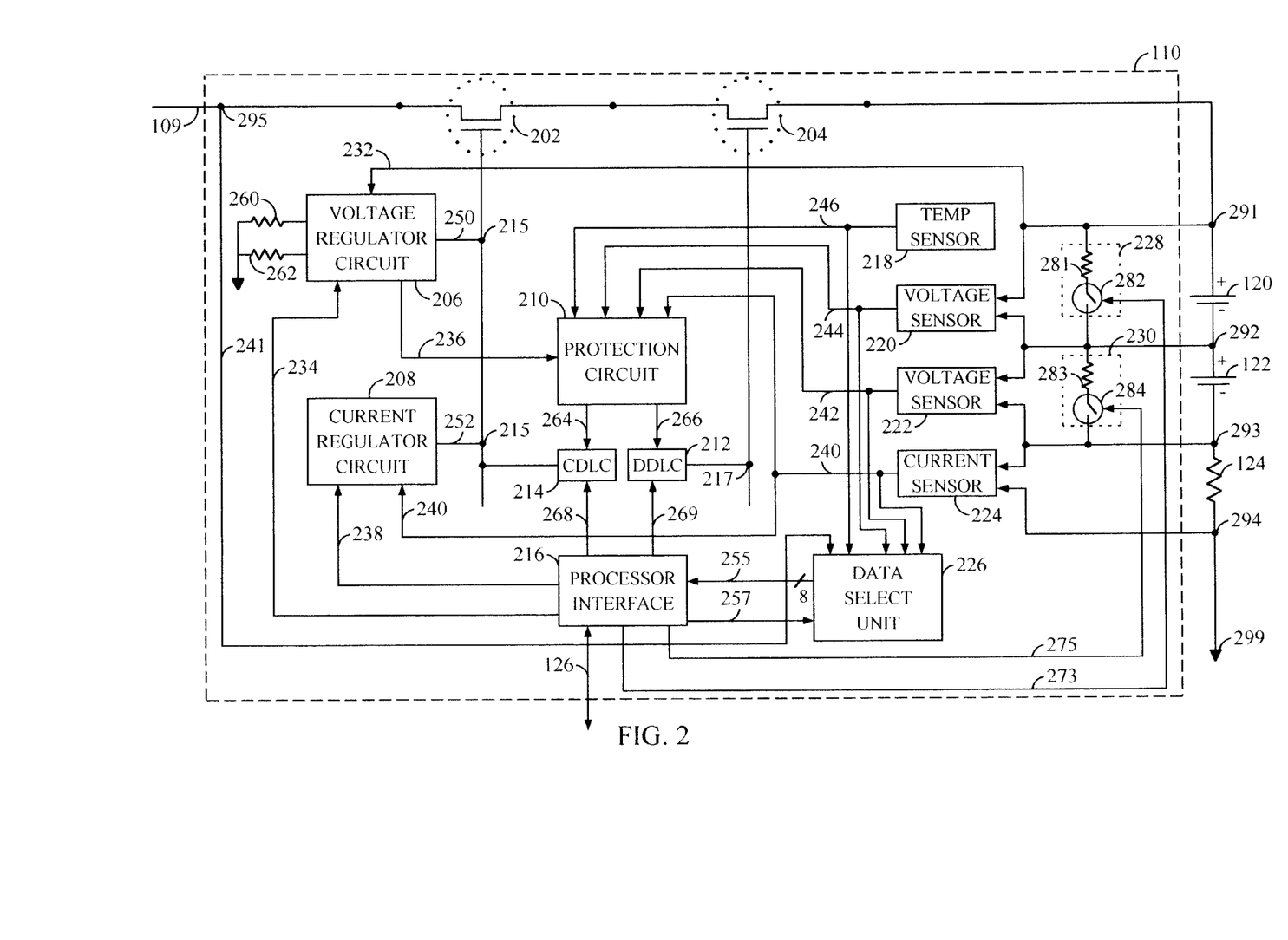
FIG. 2 illustrates one embodiment of a battery pack controller.

FIG. 2 illustrates one embodiment of controller 110. As shown in FIG. 2, controller 110 includes a charge field effect transistor (FET) 202 and a discharge FET 204. However, in an alternative embodiment where controller 110 is implemented as an integrated circuit (IC) charge FET 202 and discharge FET 204 can be internal to the IC or external to the IC.

Charge FET 202 and discharge FET 204 are connected in series with battery cells 120 and 122. Charge FET 202 and discharge FET 204 are also connected drain to drain to form a bidirectional switch. Charge FET 202 and discharge FET 204 are independently controllable, such that charge FET 202 can be shut down to terminate charging of battery cells 120, 122 and discharge FET 204 can be turned off to terminate discharging of battery cells 120, 122.

Controller 110 further includes a voltage regulator circuit 206 and a current regulator circuit 208 that drives charge FET 202 in a linear region so as to limit the voltage and current flowing into battery cells 120, 122, respectively. Voltage regulator circuit 206 and current regulator circuit 208 are connected to a gate 215 of charge FET 202 through conductors 250 and 252, respectively.

Voltage regulator circuit 206, in conjunction with charge FET 202, allows battery pack 108 to be charged by unregulated DC power supply 102. This provides a significant advantage over conventional battery packs, which must be charged by a carefully regulated DC power supply. Similarly, current regulator circuit 208 enables battery pack 108 to be charged without the use of an external current limit circuit.

Voltage regulator circuit 206 has two modes of operation, normal mode and pulse charge mode. When operating in normal mode, voltage regulator circuit 206 drives charge FET 202 in its linear region so as to ensure that a charge voltage does not exceed a predetermined maximum value, regardless of the output voltage of unregulated DC power supply 202. The charge voltage is the voltage at a node 291 with respect to a common reference node 299. Voltage regulator circuit 206 is connected to node 291 through a conductor 232. Preferably, for the illustrated two-cell battery pack, the predetermined maximum value is 8.4 volts. That is, the charge voltage is clamped at 8.4 volts. The level at which the charge voltage is clamped is determined by the value of a voltage set resistor 260.

In addition to its normal mode of operation, voltage regulator circuit 206 can operate in what is termed pulse charge mode. When in pulse charge mode, voltage regulator circuit 206 "pulse charges" battery cells 120, 122. That is, voltage regulator circuit 206 sets the charge voltage to a level that is higher than the predetermined maximum value for a predetermined pulse period, such as a pulse period of 100 milliseconds. The 100 millisecond pulse period example is given for the purpose of illustration, not limitation. The level of the charge voltage during pulse charging is determined by a pulse set resistor 262.

The mode in which voltage regulator circuit 206 operates is determined by the voltage level on a conductor 234, which connects voltage regulator circuit 206 with a processor interface 216. Processor interface 216 sets the voltage level on conductor 234 based on a control message received from processor 130 over bus 126. That is, a particular predetermined message sent from processor 130 to processor interface 216 causes processor interface 216 to set the voltage level on conductor 234 to a particular level, thereby placing voltage regulator circuit 206 in either normal mode or pulse charge mode. Therefore, processor 130 can remotely set the mode of voltage regulator circuit 206 to either the normal mode or the pulse charge mode.

Figure 3:
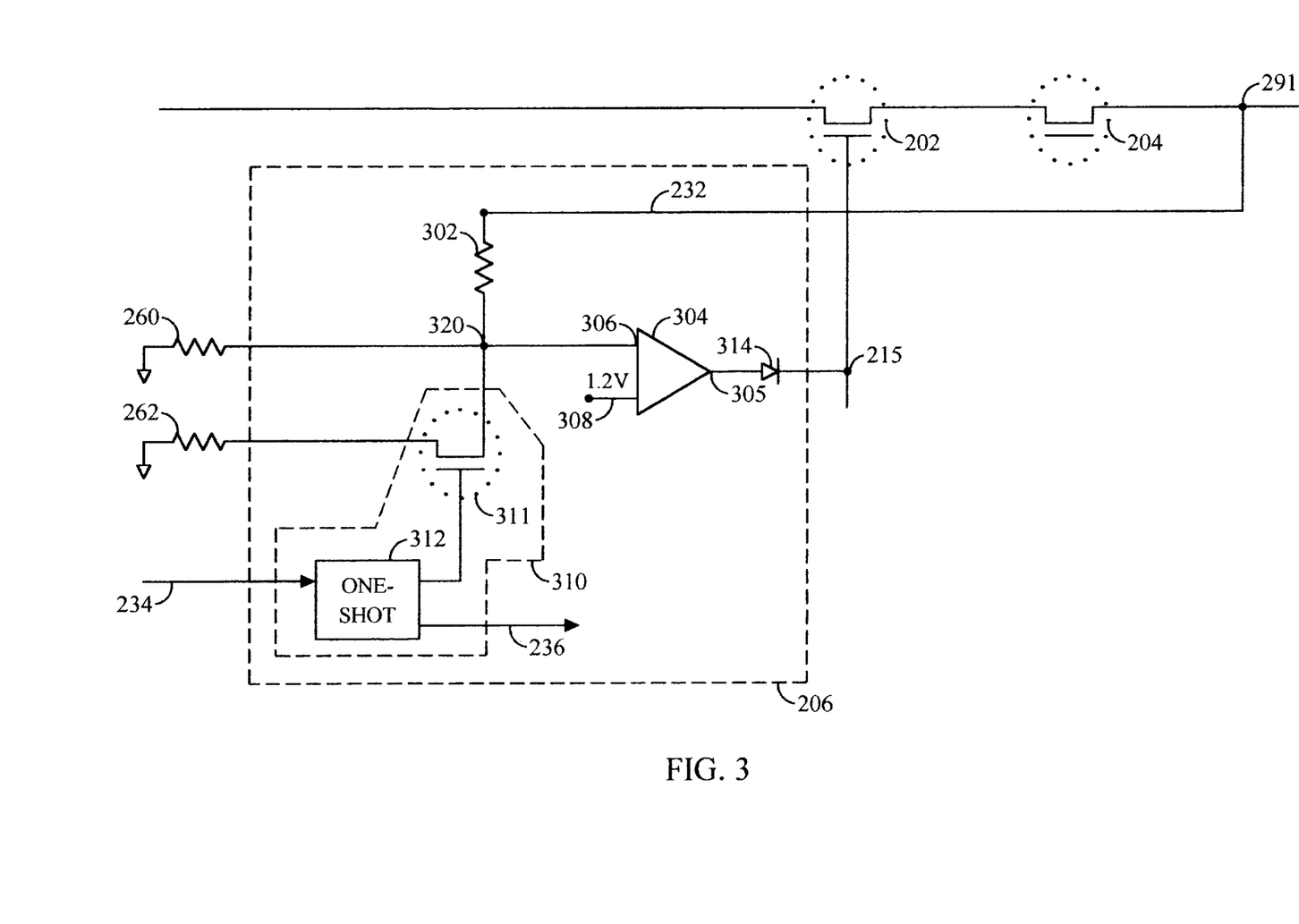
FIG. 3 illustrates one embodiment of a voltage regulator circuit.

FIG. 3 illustrates one embodiment of voltage regulator circuit 206. As shown in FIG. 3, voltage regulator circuit 206 includes a comparator 304, a diode 314, and a pulse charging circuit 310. Preferably, comparator 304 is a differential amplifier. Pulse charging circuit 310 includes a FET 311 and a nonretrigerable one-shot 312. In one embodiment, the nonretrigerable one-shot 312 is a 100 millisecond nonretrigerable one-shot. The anode of a diode 314 is coupled to an output 305 of comparator 304 and the cathode of diode 314 is coupled to gate 215 of charge FET 202. Comparator 304 has two inputs 306 and 308. Comparator input 306 is coupled to node 291 through a resistor 302, to common reference node 299 through resistor 260, and to the source of FET 311. Comparator input 308 is coupled to a constant 1.2 volt voltage source. The drain of FET 311 is coupled through resistor 262 to common reference node 299. The gate of FET 311 is coupled to an output of one-shot 312. The other output of one-shot 312 is coupled to protection circuit 210 through a conductor 236. The input of one-shot 312 is coupled to processor interface 216 through conductor 234.

The output voltage of voltage regulator circuit 206 drives charge FET 202 in its linear region so as to regulate the charge voltage. That is, the output voltage of voltage regulator circuit 206 determines the charge voltage, provided, of course, that protection circuit 210 has not disabled charge FET 202. The output voltage of voltage regulator circuit 206 is a function of the difference between the voltage at comparator input 308 and input 306. The voltage at comparator input 306 is the voltage at node 320 and the voltage at comparator input 308 is, preferably, a constant 1.2 volts. When voltage regulator circuit 206 is in normal mode, the voltage at node 320 is a function of the charge voltage (that is, the voltage at node 291), the resistance of resistor 302, and the resistance of resistor 260. The charge voltage, however, is a function of voltage regulator circuit 206 output voltage. Thus, voltage regulator circuit 206 uses feedback to clamp the charge voltage at the desired level.

When voltage regulator circuit 206 is in pulse charge mode, FET 311 is turned on by one-shot 312 for a period of 100 milliseconds, during which time the voltage at node 320 is a function of the charge voltage, the resistance of resistor 302, the resistance of resistor 260, and the resistance of resistor 262. In addition, when in pulse charge mode, voltage regulator circuit 206 sends a signal to protection circuit 210 over conductor 236. This signal temporarily disables protection circuit 210 and allows the charge voltage to exceed the voltage at which the charge voltage is clamped when voltage regulator circuit 206 is operating in normal mode.

Current regulator circuit 208 in conjunction with charge FET 202 allows battery pack 108 to be charged without having to use an external current regulation circuit. This provides a significant advantage over conventional battery packs.

Current regulator circuit 208 has two inputs and one output. The first input is connected to an output of processor interface 216 through a conductor 238 and the second input is connected to the output of a current sensor 224 through a conductor 240. Current sensor 224 outputs a signal onto conductor 240 that corresponds to the charge current. The output of charge regulator 208 is connected to gate 215 of charge FET 202 through a conductor 252.

Like voltage regulator circuit 206, current regulator circuit 208 can operate in two modes. Current regulator circuit 208 can operate in a full-rate mode or a trickle charge mode. When operating in full-rate mode, current regulator circuit 208 drives charge FET 202 in a linear region such that the current flowing into battery cells 120, 122 does not exceed a first predetermined amount, such as 1.5 amperes. When operating in trickle charge mode, current regulator circuit 208 drives charge FET 202 such that the current flowing into battery cells 120, 122 does not exceed a second predetermined amount, such as 0.1 amperes. These particular maximum current values, 1.5 amperes and 0.1 amperes, are given for the purposes of illustration rather than limitation. It is expected that different maximum full rate mode charge currents and maximum trickle charge currents will be required for different battery packs. The value of resistor 124 can be changed to accommodate these different currents.

Trickle charge mode is used when battery cells 120, 122 are deeply discharged. This occurs when the voltage of either battery cell is below a threshold amount, such as 2.5 volts. When a battery is deeply discharged, it is dangerous to charge that battery using a high current. Thus, trickle charge mode is used when battery cells 120, 122 are deeply discharged.

The mode in which current regulator circuit 208 operates is determined by the voltage level on conductor 238, which connects current regulator circuit 208 with processor interface 216. Processor interface 216 sets the voltage level on conductor 238 based on a control message received from processor 130 over bus 126. That is, a particular predetermined message sent from processor 130 to processor interface 216 causes processor interface 216 to set the voltage level on conductor 238 to a particular level. Therefore, processor 130 can remotely set the mode of current regulator circuit 208 to either the full-rate mode or the trickle charge mode.

Figure 4:
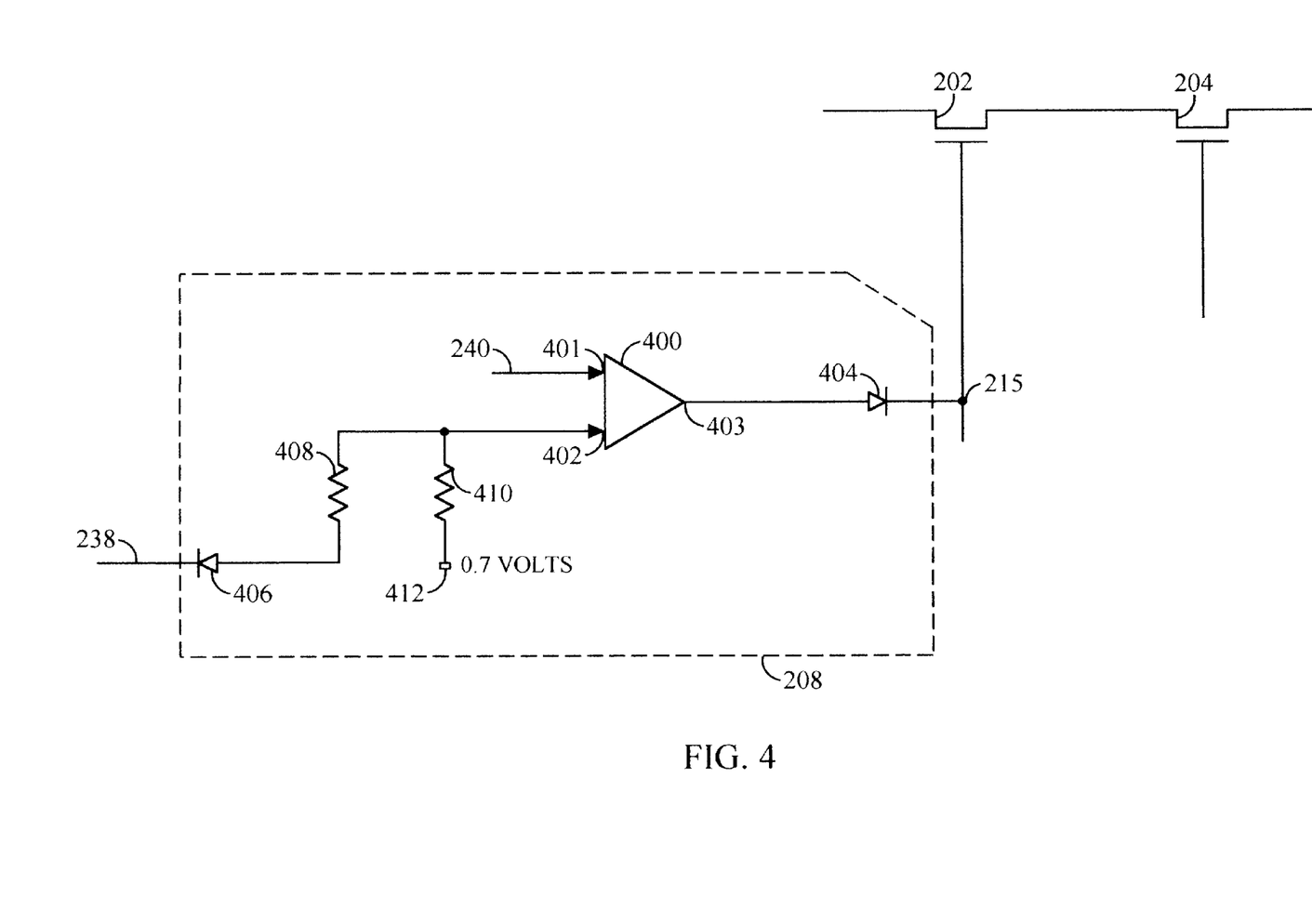
FIG. 4 illustrates one embodiment of a current regulator circuit.

FIG. 4 illustrates one embodiment of current regulator circuit 208. As shown in FIG. 4, current regulator circuit 208 includes a comparator 400, a first diode 404, and a second diode 406. Preferably, comparator 400 is a differential amplifier. The output from current sensor 224 is connected to an input 401 of comparator 400 through conductor 240. An input 402 of comparator 400 is coupled to a constant 0.7 volt voltage source through a resistor 410 and is coupled to the anode of second diode 406 through a resistor 408. The output 403 of comparator 400 is coupled to the anode of a first diode 404. The cathode of diode 404 is coupled to gate 215 of charge FET 202 and the cathode of diode 406 is coupled to processor interface 216 through conductor 238.

The output voltage of current regulator circuit 208 drives charge FET 202 in a linear region so as to regulate the charge current. The output voltage of current regulator circuit 208 is a function of the difference between the voltage at comparator input 401 and the voltage at input 402. The voltage at comparator input 401 is a function of the charge current sensed by current sensor 224. When current regulator circuit 208 is in full-rate mode, the voltage at comparator input 402 is a function of resistor 410, and when current regulator circuit 208 is in trickle mode the voltage at input 402 is a function of both resistor 410 and resistor 408. In one embodiment, the values of resistors 410 and 408 are chosen such that when in full-rate mode the output voltage of comparator 401 drives charge FET 202 so that the charge current does not exceed 1.5 amperes, and when in trickle mode the output voltage of comparator 401 drives charge FET 202 so that the charge current does not exceed 0.1 amperes.

Controller 110 further includes a protection circuit 210 having a first input connected to a temperature sensor 218 through a conductor 246, a second input connected to a first voltage sensor 220 through a conductor 244, a third input connected to a second voltage sensor 222 through a conductor 242, and a fourth input connected to the current sensor 224 through conductor 238. Temperature sensor 218 measures the temperature of battery pack 108 and outputs a signal onto conductor 246 corresponding to the measured temperature. First voltage sensor 220 is connected across first battery cell 120 at nodes 291 and 292 and outputs a signal onto conductor 244 corresponding to the voltage of first battery cell 120. Second voltage sensor 222 is connected across second battery cell 122 at nodes 292 and 293 and outputs a signal onto conductor 242 corresponding to the voltage of second battery cell 122. Current sensor 224 is connected across current sense resistor 124 at nodes 293 and 294 and outputs a signal onto conductor 240 corresponding to the charge current flowing through resistor 124.

Protection circuit 210 continuously monitors the voltage of first battery cell 120, the voltage of second battery cell 122, the charge current flowing through current sense resistor 124, and the temperature of battery pack 108 by receiving the output signals from voltage sensors 220 and 222, current sensor 224, and temperature sensor 218. The function of protection circuit 210 is to turn off charge FET 202 under the following conditions: (1) over voltage on either battery cell 120, 122; (2) over current; or (3) over temperature. That is, if the voltage of either battery cell 120, 122, the charge current, or the temperature exceeds a predetermined respective threshold, protection circuit 210 turns off the charge FET 202, thereby effectively terminating charge current from flowing into battery cells 120, 122.

Protection circuit 210 also shuts down discharge FET 204 if either battery cell 120, 122 experiences an under voltage condition or the discharge current exceeds a predetermined threshold. A battery cell experiences an under voltage condition when its voltage falls below a predetermined threshold.

Protection circuit 210 turns off charge FET 202 by sending a predetermined signal to charge disable logic circuit (CDLC) 214 through conductor 264. CDLC 214 is connected to gate 215 of charge FET 202. When CDLC 214 receives the predetermined signal from protection circuit 210, CDLC 214 drives gate 215 of charge FET 202 so as to not allow current to flow from the charge FET's source to its drain, thereby shutting down or turning off charge FET 202.

Similarly, protection circuit 210 turns off discharge FET 204 by sending a predetermined signal to discharge disable logic circuit (DDLC) 212 through conductor 266. DDLC 212 is connected to gate 217 of discharge FET 204. When DDLC 212 receives the predetermined signal from protection circuit 210, DDLC 212 drives gate 217 of discharge FET 204 so as to not allow current to flow from the discharge FET's source to its drain, thereby shutting down or turning off of discharge FET 204.

Processor interface 216 is also connected to CDLC 214 and DDLC 212. Processor interface 216 is connected to CDLC 214 through conductor 268 and is connected to DDLC 212 through conductor 269. Having processor interface 216 connected to CDLC 214 and DDLC 212 enables processor 130 to turn off charge FET 202 and discharge FET 204. More specifically, processor interface 216 is designed such that when processor 130 transmits a charge disable signal or message to processor interface 216 over bus 126, processor interface 216 sends a signal to CDLC 214 causing CDLC 214 to turn off charge FET 202. Similarly, when processor 130 sends a discharge disable signal or message to processor interface 216 over bus 126, processor interface 216 sends a signal to DDLC 212 causing DDLC 212 to turn off discharge FET 204.

In addition to having protection circuit 210 monitor battery pack 108, processor 130 also monitors battery back 108. The output signals from temperature sensor 218, first voltage sensor 220, second voltage sensor 222, and current sensor 224 are sent to data select unit 226. Also, an input of a data select unit 226 is connected to node 295 through conductor 241 so that the battery pack input voltage can be monitored by processor 130. Processor 130 determines which item to monitor and sends a particular data select signal to processor interface 216. Upon receiving the data select signal, processor interface 216 sends a select signal to data select unit 226 over conductor 257. Based on the select signal, data select unit 226 digitizes the input corresponding to the select signal if that input is an analog signal and outputs a digital signal to processor interface 216 over conductor 255. Processor interface 216 then transmits the digital signal to processor 130 over bus 126. In this manner, processor 130 can monitor battery pack 108. The information gathered by processor 130 while monitoring battery pack 108 can be used by processor 130 to determine when to turn off charge FET 202 and discharge FET 204 and to "gas gauge" the battery pack during discharge.

Controller 110 further includes a mechanism for "balancing" battery cells 120, 122. That is, battery pack controller 110 includes a mechanism for ensuring that the voltage of first battery cell 120 and the voltage of second battery cell 122 remain substantially equal or balanced. Controller 110 includes a first balancing circuit 228 and a second balancing circuit 230. First balancing circuit 228 is connected in parallel with first battery cell 120 and second balancing circuit 230 is connected in parallel with second battery cell 122. First balancing circuit 228 includes a discharge resistor 281 connected in series with a balancing switch 282. When switch 282 is open, no current flows through discharge resistor 281. But when switch 282 is closed, discharge resistor 282 is connected across first battery cell 120, allowing first battery cell 120 to gradually discharge. Second balancing circuit 230 also includes a discharge resistor 283 connected in series with a balancing switch 284 and operates in a like manner.

Processor interface 216 is connected to a control port (not shown) of balancing switch 282 through conductor 273 and to a control port (not shown) of balancing switch 284 through conductor 275. Balancing switches 282, 284 are controllable by processor 130 through processor interface 216. That is, processor 130 opens or closes each balancing switch 282, 284, which comprise well known elements, by transmitting predetermined message or signals to processor interface 216.

Typically, both switches 282, 284 are open. But if the voltage of first battery cell 120 becomes greater than the voltage of second battery cell 122, processor 130 sends a first battery cell discharge message to processor interface 216. Upon receiving the message, processor interface 216 uses conductor 273 to drive balancing switch 282 so that balancing switch 282 closes, thereby allowing first battery cell 120 to gradually discharge. Once the voltage of first battery cell 120 substantially equals the voltage of second battery cell 122, processor 130 sends a second message to processor interface 216, causing processor interface 216 to change the voltage on conductor 273 so that balancing switch 282 opens, thereby terminating the gradual discharge of first battery cell 120. The same process occurs when the voltage of second battery cell 122 becomes greater than the voltage of battery cell 120, except that processor 130 opens and closes switch 284, accordingly.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A battery pack, which can be recharged by an external DC power source, comprising:
   a battery cell;
   an input terminal that connects to the external DC power source; and
   a battery pack controller coupled between said input terminal and said battery cell, said battery controller comprising:
      coupling means for coupling said battery cell to said input terminal so as to receive a DC voltage produced by the DC power source; and
      a voltage regulator having a voltage regulator circuit that controls said coupling means to maintain said charge voltage below a predetermined maximum regardless of the voltage produced by the DC power supply.

2. The battery pack of claim 1, wherein said battery pack controller further comprises a current regulator that regulates a charge current flowing into said battery cell.

3. The battery pack of claim 1, further comprising a protection circuit that continuously senses a voltage across said battery cell, a charge current, and a temperature and that places said coupling means in an off state upon sensing at least one of an over current, over voltage, and over temperature condition, thereby terminating said charge current from flowing into said battery cell.

4. The battery pack of claim 1, wherein said coupling means comprises a first terminal, a second terminal, and a third terminal, said first terminal being coupled to said input terminal, said second terminal being coupled to an output of said voltage regulator circuit, and said third terminal being coupled to said battery cell.

5. The battery pack of claim 4, wherein said coupling means comprises a transistor.

6. The battery pack of claim 5, wherein said transistor comprises a field effect transistor (FET) and said first terminal corresponds to the source terminal of said FET, said second terminal corresponds to the gate terminal of said FET, and said third terminal corresponds to the drain terminal of said FET.

7. The battery pack of claim 6, further comprising a second FET coupled between the first FET and said battery cell, wherein the drain terminal of said second FET is coupled to the drain terminal of said first FET and the source terminal of said second FET is coupled to a terminal of said battery cell.

8. The battery pack of claim 1, wherein said voltage regulator circuit comprises a comparator having a first input terminal, a second input terminal, and an output terminal, said first input terminal being coupled to a terminal of said battery cell through at least one resistor, said second input terminal being coupled to a constant voltage source, and said output terminal being coupled to said coupling means, wherein an output signal of said comparator controls said coupling means to maintain said charge voltage below said predetermined maximum, regardless of said DC voltage produced by the DC power source.

9. The battery pack of claim 1, further comprising a second battery cell connected in series with the first battery cell.

10. The battery pack of claim 9, wherein said battery pack controller further comprises battery balancing means for balancing said first and second battery cells, said battery balancing means comprising first discharging means for discharging said first battery cell and second discharging means for discharging said second battery cell.

11. The battery pack of claim 10, wherein said battery pack controller further comprises:
   a processor interface that receives predetermined messages from and transmits data to an external processor;
   means for activating said first discharging means when said external processor transmits a first predetermined message to said processor interface; and
   means for activating said second discharging means when said external processor transmits a second predetermined message to said processor interface.

12. A battery pack, which can be recharged by an external DC power source, comprising:
   a battery cell;
   an input terminal that connects to the external DC power source; and
   a battery pack controller coupled between said input terminal and said battery cell for receiving a DC voltage produced by the DC power source and providing a charge voltage to said battery cell, said battery controller comprising:
      a voltage regulator for maintaining said charge voltage below a predetermined maximum regardless of the voltage produced by the DC power supply;
      a processor interface that receives predetermined messages from and transmits data to an external processor;
      a charge termination means for terminating a charge current flowing into said battery cell; and
      means for deactivating said charge termination means during a charge cycle, to allow charge current to flow to said battery cell, and for activating said charge termination means when said external processor transmits a predetermined message to said processor interface, to thereby terminate said charge cycle.

13. The battery pack of claim 12, wherein said charge termination means comprises a transistor coupled between said battery cell and said input terminal and a charge disable logic circuit that controls said transistor in response to a signal from said processor interface.

14. The battery pack of claim 12, wherein said voltage regulator comprises means for pulse charging said battery cell.

15. A battery pack, which can be recharged by an external DC power source, comprising:
- a battery cell;
- an input terminal that connects to the external DC power source; and
- a battery pack controller coupled between said input terminal and said battery cell, said battery pack controller comprising:
  - coupling means for coupling said battery cell to said input terminal so as to receive a charging current produced by the DC power source;
  - a current regulator having a current regulator circuit that controls said coupling means so as to regulate said charge current flowing into said battery cell; and
  - a current sensor that senses said charge current and outputs a signal corresponding to said charge current to said current regulator circuit.

16. The battery pack of claim 15, further comprising a protection circuit that continuously senses a voltage across said battery cell, said charge current, and a temperature and that places said coupling means in an off state upon sensing at least one of an over current, over voltage, and over temperature condition, thereby terminating said charge current from flowing into said battery cell.

17. The battery pack of claim 15, wherein said coupling means comprises a first terminal, a second terminal, and a third terminal, said first terminal being coupled to said input terminal, said second terminal being coupled to an output of said current regulator circuit, and said third terminal being coupled to said battery cell.

18. The battery pack of claim 17, wherein said coupling means comprises a transistor.

19. The battery pack of claim 18, wherein said transistor comprises field effect transistor (FET) and said first terminal corresponds to the source terminal of said FET, said second terminal corresponds to the gate terminal of said FET, and said third terminal corresponds to the drain terminal of said FET.

20. The battery pack of claim 19, further comprising a second FET coupled between the first FET and said battery cell, wherein the drain terminal of said second FET is coupled to the drain terminal of said first FET and the source terminal of said second FET is coupled to a terminal of said battery cell.

21. The battery pack of claim 15, wherein said current regulator circuit comprises a comparator having a first input terminal, a second input terminal, and an output terminal, said first input terminal being coupled to an output of said current sensor, said second input terminal being coupled to a constant voltage source, and said output terminal being coupled to said coupling means, wherein an output signal of said comparator controls said coupling means to control said charge current flowing into said battery cell.

22. The battery pack of claim 15, wherein said current regulator circuit comprises means for trickle charging said battery cell.

23. A battery pack, which can be recharged by an external DC power source, comprising:
- a battery cell;
- an input terminal that connects to the external DC power source; and
- a battery pack controller coupled between said input terminal and said battery cell comprising:
  - a current regulator for regulating a charge current flowing into said battery cell;
  - a processor interface that receives predetermined messages from and transmits data to an external processor;
  - a charge termination means for terminating a charge current flowing into said battery cell; and
  - means for deactivating said charge termination means during a charge cycle, to allow charge current to flow to said battery cell, and for activating said charge termination means when said external processor transmits a first predetermined message to said processor interface, to thereby terminate said charge cycle.

24. A battery pack, which can be recharged by an external DC power source, comprising:
- a battery cell;
- an input terminal that connects to the external DC power source; and
- a battery pack controller coupled between said input terminal and said battery cell, said battery back controller comprising:
  - a processor interface to receive predetermined messages from an external processor;
  - a charge termination means for terminating a charge current flowing into said battery cell; and
  - a conductor coupling said processor interface to said charge termination means, wherein when said processor interface receives a given one of said predetermined messages, said processor interface sets a voltage of said conductor to a level that activates said charge termination means, thereby terminating charge current from flowing to said battery cell.

25. The battery pack of claim 24, wherein said battery controller further comprises a voltage regulator, wherein when said input terminal is connected to the external DC power source said battery pack controller receives a DC voltage produced by the DC power source and provides a charge voltage to said battery cell, said voltage regulator maintaining said charge voltage below a predetermined maximum regardless of the voltage produced by the DC power supply.

26. The battery pack of claim 25, wherein said battery pack controller further comprises a current regulator that regulates said charge current flowing into said battery cell.

27. The battery pack of claim 26, said battery pack controller further comprising a protection circuit that continuously senses a voltage across said battery cell, a charge current, and a temperature and that activates said charge termination means upon sensing at least one of an over current, over voltage, and over temperature condition, thereby terminating said charge current from flowing into said battery cell.

28. The battery pack of claim 24, wherein said charge termination means comprises a transistor having a first terminal, a second terminal, and a third terminal, said first terminal being coupled to said input terminal, said second terminal being coupled to said processor interface, and said third terminal being coupled to said battery cell.

29. The battery pack of claim 28, wherein said transistor comprises a field effect transistor (FET) and said first terminal corresponds to the source terminal of said FET, said second terminal corresponds to the gate terminal of said FET, and said third terminal corresponds to the drain terminal of said PET.

30. The battery pack of claim 29, further comprising a second FET coupled between the first FET and said battery cell, wherein the drain terminal of said second FET is coupled to the drain terminal of said first FET and the source terminal of said second FET is coupled to a terminal of said battery cell.

31. The battery pack of claim 24, further comprising a second battery cell connected in series with the first battery cell.

32. The battery pack of claim 31, wherein said battery pack controller further comprises battery balancing means for balancing said first battery cell and said second battery cell, said battery balancing means comprising first discharging means for discharging said first battery cell and second discharging means for discharging said second battery cell.

33. The battery pack of claim 32, further comprising:
means for activating said first discharging means when said external processor transmits a second predetermined message to said processor interface, thereby discharging said first battery cell; and
means for activating said second discharging means when said external processor transmits a third predetermined message to said processor interface, thereby discharging said second battery cell.

* * * * *